United States Patent [19]

Kobayashi

[11] 4,272,322
[45] Jun. 9, 1981

[54] METHOD FOR MANUFACTURING CHARCOALS FROM PAPER SLUDGE

[76] Inventor: Masahiro Kobayashi, 12-38, Kamishimizu-cho, Shimizu-shi, Shizuoka-ken, Japan

[21] Appl. No.: 26,774

[22] Filed: Apr. 3, 1979

[30] Foreign Application Priority Data

Apr. 3, 1978 [JP] Japan .................................. 53/38080
Aug. 28, 1978 [JP] Japan ................................: 53/103885

[51] Int. Cl.³ ........................ C10B 47/06; C10L 5/44
[52] U.S. Cl. ......................................... 201/6; 201/21; 201/25; 44/1 D
[58] Field of Search ....................... 201/2.5, 6, 21, 25; 44/1 D, 1 F, 10 A, 10 E, 10 G, 10 J, 10 K

[56] References Cited

U.S. PATENT DOCUMENTS

| | | | |
|---|---|---|---|
| 504,264 | 8/1893 | Bergmann | 201/6 |
| 1,898,326 | 2/1933 | Wahlstrom | 201/21 X |
| 2,334,620 | 11/1943 | Goodell | 201/21 X |
| 3,642,458 | 2/1972 | Hess et al. | 44/1 X |
| 3,841,974 | 10/1974 | Osborne | 201/2.5 |
| 3,862,909 | 1/1975 | Copeland | 201/2.5 X |
| 3,971,705 | 7/1976 | Norita et al. | 201/2.5 |
| 4,028,068 | 6/1977 | Kiener | 201/2.5 X |

FOREIGN PATENT DOCUMENTS 141505 4/1920 United Kingdom ................... 201/25

*Primary Examiner*—Tim R. Miles
*Assistant Examiner*—Roger F. Phillips
*Attorney, Agent, or Firm*—Armstrong, Nikaido, Marmelstein & Kubovcik

[57] ABSTRACT

A method of manufacturing charcoal comprising the steps of mixing at least one kind of material selected from the group including coffee pulps, almond husks, orange peelings, walnut shells and bean jam waste etc. with paper sludge, molding the resultant mixture in any desired configuration, and then allowing the resultant moldings to subject to dry distillation at a temperature of about 300° to 600° C.

An apparatus for carrying out the abovementioned method comprising a double-walled housing including an inner wall and an outer wall the space between the inner and outer walls being filled with water, the space surrounded by the double-walled housing being divided by a partition wall extending to a predetermined height from the base of the housing into a combustion chamber and a carbonization chamber.

4 Claims, 3 Drawing Figures

METHOD FOR MANUFACTURING CHARCOALS FROM PAPER SLUDGE

BACKGROUND OF THE INVENTION

1. Field of the Invention

This invention relates to a method for manufacturing charcoal from paper sludge and an apparatus therefor.

2. Description of the Prior Art

Charcoal heretofore in use has been made from wood as the main raw materials thereof such as Quercus serrata, Quercus glandulifera and oak etc. However, these woods cannot be cut down without any restriction, and once cut down or lumbered, at least five years are required until they grow up again. In veiw of the limited area of mountains and forests in the world, there is a limit in the supply of raw materials.

As for a conventional method of manufacturing charcoal, the method of baking woods in a casserole had been employed. In Yamanashi Prefecture, Japan, charcoal making has been made by putting 2,000 kgs of wood material in an oven, in which case firewood of 200 kgs corresponding to 10% of the weight of the wood material was required. The firewood of 200 kgs is let to burn continuously for three days and then left as it is for about six or seven days until it goes out completely. Meanwhile, the degree of carbonization of the wood is discriminated by checking the colour of the smoke or by pressing a match stick to a stack to see whether or not it can be ignited in twelve or thirteen seconds. In the above-mentioned method of discriminaing the degree of carbonization, the heat loss rate of the firewood reaches about two thirds of the total heat quantity, that is; more than half of the firewood of 200 kgs is burnt ineffectively. Further, the partition wall on the side of a fuel hole must be broken to take out the inside charcoal thus produced.

Thus, generally speaking, in the conventional manufacturing process of charcoal, there is a limit in the suppply of wood materials. The thermal efficiency of charcoal making apparatus is low, and the accommodating capacity of the oven is reduced in the case of bent wood materials to be used thereby reducing the production efficiency and increasing the cost of the charcoal thus obtained.

On the other hand, the process of manufacturing solid fuels from paper pulp wastes is well known. For example, disclosed in the Japanese Patent Publication No. 21222/1972 is a method of manufacturing a solid fuel which comprises recovering paper pulp waste, charging the paper pulp waste into a mold, pressurizing the pulp waste at a pressure of 10 to 20 kg/cm$^2$ so as to achieve dehydration, then drying the dehydrated pulp waste so as to obtain moldings or preforms having a moisture content of about 10%, dipping said moldings in a liquid fuel such as heavy oils etc. and finally coating the outer periphery of said moldings with molten paraffin. Further, in the Japanese Patent Publication No. 8962/1976, there is disclosed a method of manufacturing a solid fuel which differs from the aforementioned process in which kerosine or gas oil is used instead of heavy oils, and also polyethylene or polypropylene is used in place of the molten paraffin for coating the moldings.

However, in any of the above-mentioned methods, oils such as heavy oils and kerosine are used as fuel and dry distillation process is not employed in the manufacturing process.

SUMMARY OF THE INVENTION

It is therefore an object of the present invention to provide a method of manufacturing charcoal from paper sludges usually produced in large quantities from paper manufacturing plants thereby causing public nuisance or pollution problems.

Another object of the present invention is to provide a method of manufacturing charcoal with a high productivity.

A further object of the present invention is to manufacture charcoal of a high quality in large quantities and at low cost from various kinds of wastes produced in large quantities and without cost such as paper sludges, coffee pulps (bean-taken-out coffee remainders), almond husks, orange peelings, walnut shells and bean jam wastes etc.

A still further object of the present invention is to provide charcoal having improved ignition and combustion characteristics.

A still other object of the present invention is to contribute to the solution of public nuisance problems by utilizing paper sludges as a raw material for charcoal in connection with the aforementioned objects.

Another object of the present invention is to provide an apparatus for manufacturing charcoal from paper sludges.

A still further object of the present invention is to provide an apparatus for manufacturing charcoal from paper sludges in economical way and with a high operating efficiency.

According to the present invention, there is provided a method of manufacturing charcoal from paper sludges, comprising the steps of mixing at least one kind of raw material selected from the group consisting essentially of coffee pulps, almond husks, orange peelings, walnut shells and bean jam wastes etc. with paper sludge having a moisture content of less than about 50%, molding the resultant in any desired configuration, preferably in cylindrical shape, and then subjecting the resultant moldings to dry distillation at a temperature of about 300° to 600° C. for between one and three days.

Further, as for the apparatus for achieving the above-mentioned objects of the present invention and which is adapted to carry out the method of the invention, there is provided an apparatus for manufacturing charcoal from paper sludges comprising:

(a) a double-walled housing including an inner wall and an outer wall surrounding said inner wall, the space between said inner wall and said outer wall being filled with water, (b) a partition wall fixedly secured to and extending uprights from the bottom of said inner wall to divide the inside of the inner wall to a predetermined height into a combustion chamber and a carbonization chamber, (c) fire grate means mounted in said combustion chamber, (d) a bilge box mounted in the bottom part of the inner wall of said carbonization chamber, (e) a cylindrical stack connected with said bilge box, (f) an air inlet port extending through the housing on the side of the combustion chamber located below said fire grate means, and (g) a firewood supply port extending through the substantially central part of said housing on the side of the combustion chamber located above said fire grate means.

The above and other objects, features and advantages of the present invention will be readily apparent from the following description taken in conjunction with the accompanying drawings.

DETAILED DESCRIPTION OF THE INVENTION

Figure 1:
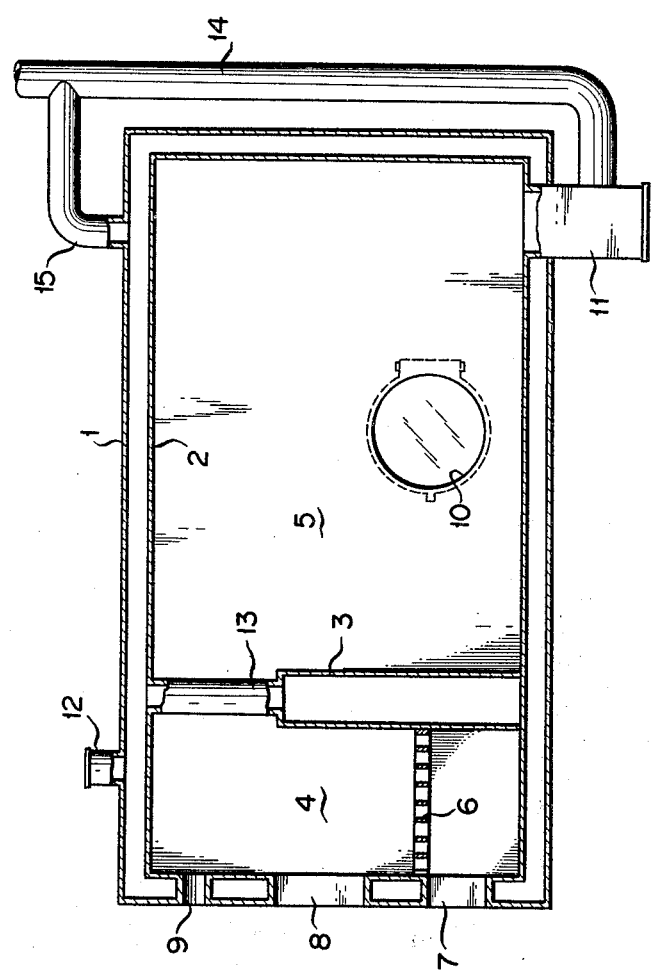
FIG. 1 is a longitudinal side elevational view of a charcoal manufacturing apparatus according to the present invention.
Figure 2:
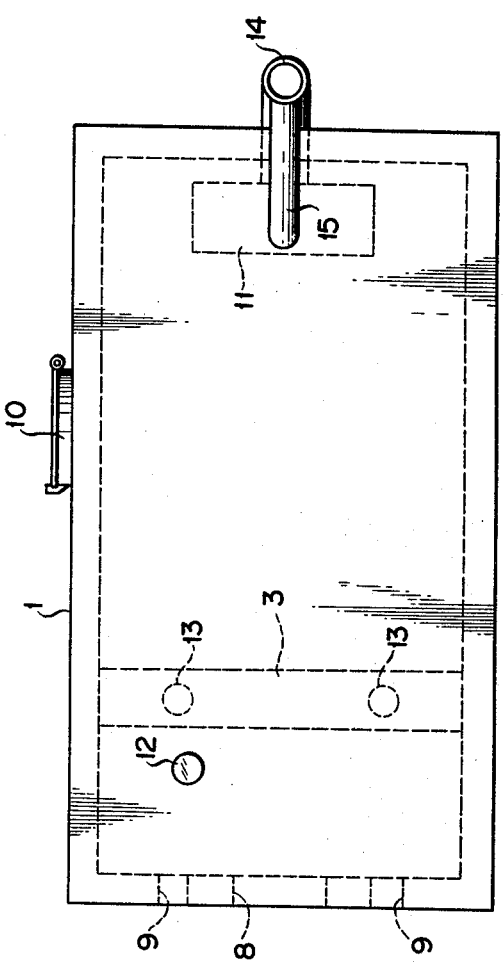
FIG. 2 is a top plan view of FIG. 1.
Figure 3:
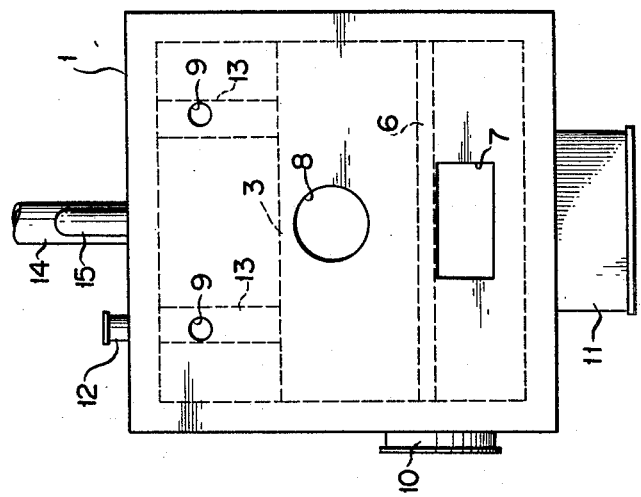
FIG. 3 is a front elevational view of FIG. 3.

Paper sludges are wastes produced after pulping woods. Such paper sludges are derived from woods and contain cellulose, and therefore their carbonization processes are not basically different from those of the charcoals heretofore in use. However, it should be noted that such paper sludges give off a bad smell and are in the state of sludge.

In the first place, paper sludges are processed by a dehydrator or dried so as to reduce the moisture content thereof less than about 50%, preferably to 20 to 40%. When the moisture content of paper sludges is too high, it is difficult to mold them, and therefore it is preferable to reduce their moisture content as low as possible in order to obtain a product having a high calorific value. Then, a proper amount of one or several kinds of raw materials selected from the group including coffee pulps, almond husks, orange peelings, walnut shells and bean jam wastes etc. is mixed, depending on the property thereof, with paper sludges having a moisture content of less than about 50%, and the mixture thus obtained is molded in any desired configuration, for example, in the shape of plate, round rod, square rod and cylinder by compression molding or extrusion molding or the like. In such case, it is preferable to mold the mixture in cylindrical shape because the time required for dry distillation can be substantially reduced thereby improving the productivity, and also the product thus obtained will have excellent ignition and combustion characteristics.

In the case where the mixture contains coffee pulps, an effect can be obtained that the bad smell which is inherent to the paper sludges and is emitted when molding or baking the mixture in a casserole can be eliminated or absorbed. Further, coffee pulps have a high calorific value of about 5,500 kcal/kg and so the product obtained will have a high calorific value. The component of ordinary coffee pulps comprises a moisture content of about 5.2%, ash content of about 3.5%, volatile matter of about 69.5% and carbon content of about 21.7%. However, because the ignition temperature of coffee pulps is about 231° C., the amount of mixing should, preferably, be less than 30% by weight, and they are usually mixed in the range of 1 to 30% by weight. Almond husks have properties and effects similar to those of coffee pulps and usually have moisture content of about 1.5%, ash content of about 10 to 12%, volatile matter of about 10 to 12% and carbon content of about 75%. Such almond husks have a high calorific value of about 6,000 to 7,000 Kcal/kg. Therefore, almond husks are more suitable for additive material.

Walnut shells have a high calorific value of about 7,000 Kcal/kg like almond husks, but orange peelings have a somewhat lower calorific value of about 4,000 Kcal/kg. Bean jam wastes have a calorific value of about 5,000 Kcal/kg. When bean jam wastes are mixed, they serve not only as an additive material, but also increases the viscosity of the mixture so as to facilitate molding of the mixture. It is usually enough to keep the amount of almond husks, orange peelings, walnut shells and bean jam wastes to be mixed below 30% by weight, respectively. Only the aforementioned additive materials may be added without adding coffee pulps. When the molded paper sludges containing the abovementioned additive materials are subjected to dry distillation, the moisture content thereof will evaporate, and decomposition of organic matters contained therein will occur when the temperature thereof reaches about 150° C., and at a temperature of about 260° to 280° C. the decomposition will become more active. At that time, charcoal gases such as carbon dioxide, carbon monoxide, hydrogen and hydrogen carbide etc. are produced, and part of them will be charged into wood vinegar such as water, methanol, acetone, acetic acid and phenol or carbolic acid etc. so as to form wood tars. Further the residual substance will form charcoal containing carbon as its main component. Dry distillation is carried out at a temperature of about 300° to 600° C. for a predetermined time, usually for between one and three days.

The present invention will now be described in more detail with reference to the accompanying drawings.

As shown in the drawings, an apparatus of the present invention comprises a double-walled housing formed by an outer wall 1 and an inner wall 2 formed inside thereof and at a predetermined space interval therefrom, the space defined between the outer wall 1 and the inner wall 2 being filled with water. The inner space of the apparatus surrounded by the abovementioned housing is divided by a partition wall 3 extending to a pretermined height from the bottom of the housing into a combustion chamber 4 and a carbonization chamber 5, said partition wall 3 being also of double-walled construction, the space within the double walls being filled with water. A fire grate 6 is mounted in the lower part of the combustion chamber 4 so that the firewood placed on the fire grate 6 can be burnt. The raw material for charcoal obtained by molding paper sludges is placed in the carbonization chamber 5 so as to be subjected to carbonization. In the front part of the apparatus, a primary air inlet port 7 is located in the lower part thereof, and a firewood supply port 8 is located in the central part thereof, and further a secondary air inlet port 9 is located in the upper part thereof. The primary air inlet port 7 is required to be placed under the fire grate 6, and the firewood supply port 8 serves also as an inspection port for observing the condition of combustion of the firewood.

Reference numeral 10 denotes a manhole for supplying raw material into the carbonization chamber 5 and taking it out therefrom. In the rear part of the apparatus and in the lower part of the carbonization chamber 5, there is provided a bilge box 11 which serves to store wood tars produced when paper sludges are being subjected to dry distillation. The floor of the carbonization chamber 5 is inclined a little towards the bilge box 11. Installed in the upper part of the apparatus is a water inlet 12 for supplying water into the double-walled housing. The space within the double-walled housing is communicated with the internal space of the partition wall 3 by means of a pipe or conduit 13. Connected with the bilge box 11 is a cylindrical stack 14, the leading end of which is open to the atmosphere, said cylindrical stack being connected with the internal space of the double-walled housing by means of a pipe 15 thereby enabling the steam generated from the water within the housing to be released through the cylindrical stack 14 to the atmosphere.

When charcoal is manufactured in the abovementioned apparatus, first of all the raw material or the molded paper sludge is placed in the carbonization chamber 5, and then the internal space of the double-walled housing is filled with water. Thereafter, firewood is placed in the combustion chamber 4 and is burnt. When the ceiling of the carbonization chamber 5 has reached to a temperature of 300° to 350° C., decomposition of the cellulose component is accelerated. When the bottom part of the carbonization chamber 5 has reached a temperature of 300° to 350° C., boiling will begin. Further, when the carbonization chamber 5 has reached a temperature of 400° to 600° C. and also the exhaust smoke port has reached about 400° C., the apparatus is sealed hermetically and then dry distillation is made for a predetermined time, usually for between one and three days. After cooling, charcoal product is taken out. The charcoal gases leaving the cylindrical stack 14 such as carbon monoxide, hydrogen and hydrocarbon etc. are combustible gases, and if such gases are supplied to the secondary air inlet port 9, the required quantity of the firewood can be reduced so that the charcoal gases can be utilized effectively. Further, by allowing the steam generated from the water within the double-walled housing to be released into the cylindrical stack 14, the sulphur content in the exhaust smoke can be eliminated.

One example of the present invention will now be described below to obtain a better understanding of the invention. Example I:

Powdery mixture comprising coffee pulps, almond husks, orange peelings and walnut shells, each weighing 100 kg (the powder particle being of such size that can pass through one mm mesh) was mixed with one ton of paper sludge with a moisture content of about 35%. After that, the mixture was molded in cylindrical shape by means of an extrusion molding machine. The resultant molding was accommodated in the carbonization chamber of the abovementioned apparatus, and firewood was burnt in the combustion chamber. The carbonization chamber was kept at a temperature of about 450° C. so as to allow the molding to subject to dry distillation for 24 hours. The resultant cylindrical charcoal had a calorific value of about 7,300 Kcal/kg.

As mentioned hereinabove, in the method of manufacturing charcoal according to the present invention, the paper sludge and various kinds of wastes available from industrial wastes are used as a raw material for charcoal, and therefore the raw material for charcoal can be obtained in large quantities and without cost. Accordingly, inexpensive charcoal can be supplied in large quantities. Further, addition of various kinds of wastes enables manufacture of charcoal having a high calorific value and facilitates molding such mixture in any desired configuration. Because such moldings have no bent portions inherent to raw materials of wood, accommodating capacity of the oven can be increased substantially thereby increasing the productivity of the charcoal manufacturing apparatus. Further, by molding the mixture in cylindrical shape, the time required for dry distillation can be reduced and charcoal having improved ignition and combustion characteristics can be obtained.

The charcoal produced by the method of the present invention can be used as a fuel for home heating, outdoor grill and barbecue etc.

While the invention is susceptible of embodiment in many different form, there is shown in the drawings and has been described herein in detail a specific embodiment of the invention, with the understanding that the present disclosure is to be considered as an exemplification of the principle of the invention and is not intended to limit the invention to the embodiment illustrated.

What is claimed is:

1. A method of manufacturing charcoal from paper sludge comprising the steps of mixing coffee pulps in an amount of 1 to 30 percent by weight with paper sludge having a moisture content of less than 50% whereby the coffee pulps absorb odors from the paper sludge, molding the resultant mixture into a desired configuration, preheating the resultant moldings to a temperature of about 400° C. whereby the odors from the paper sludge are completely absorbed by the coffee pulps, and subjecting the preheated moldings to a dry distillation at a temperature of about 400°–600° C. for between 1 and 3 days.

2. The method as claimed in claim 1, wherein the dry distillation temperature is about 450° C.

3. The method as claimed in claim 1, wherein the mixture is molded in cylindrical shape.

4. The method as claimed in claim 1 further comprising the step of mixing at least one kind of raw material selected from the group consisting of almond husks, orange peelings, walnut shells, and bean jam wastes in an amount of 1 to 30 percent by weight, respectively, with the mixture of paper sludge and coffee pulps prior to molding.

* * * * *